(12) United States Patent
Chen et al.

(10) Patent No.: US 11,665,780 B2
(45) Date of Patent: May 30, 2023

(54) MULTI-LINK POLICY SIGNALING FOR EXTREMELY HIGH THROUGHPUT (EHT)

(71) Applicant: Intel Corporation, Santa Clara, CA (US)

(72) Inventors: Cheng Chen, Portland, OR (US);
Laurent Cariou, Portland, OR (US);
Dibakar Das, Hilsboro, OR (US);
Chittabrata Ghosh, Fremont, CA (US);
Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 154 days.

(21) Appl. No.: 16/893,846

(22) Filed: Jun. 5, 2020

(65) Prior Publication Data

US 2020/0351988 A1    Nov. 5, 2020

Related U.S. Application Data

(60) Provisional application No. 62/858,462, filed on Jun. 7, 2019.

(51) Int. Cl.
| *H04W 88/10* | (2009.01) |
| *H04W 76/15* | (2018.01) |
| *H04L 45/24* | (2022.01) |
| *H04W 72/0446* | (2023.01) |
| *H04W 72/0453* | (2023.01) |

(52) U.S. Cl.
CPC ............. *H04W 88/10* (2013.01); *H04L 45/24* (2013.01); *H04W 72/0446* (2013.01); *H04W 72/0453* (2013.01); *H04W 76/15* (2018.02)

(58) Field of Classification Search
CPC ......... H04W 72/0446; H04W 72/0453; H04W 76/15; H04W 88/10; H04L 45/24
See application file for complete search history.

(56) References Cited

U.S. PATENT DOCUMENTS

| 10,165,470 | B2 * | 12/2018 | Azizi | ..................... H04W 28/18 |
| 2017/0373816 | A1 * | 12/2017 | Son | ..................... H04W 74/085 |
| 2019/0158413 | A1 * | 5/2019 | Patil | ...................... H04W 88/06 |
| 2019/0268956 | A1 * | 8/2019 | Xiao | ..................... H04W 48/12 |
| 2019/0387524 | A1 * | 12/2019 | Asterjadhi | ............ H04W 72/02 |
| 2020/0163141 | A1 * | 5/2020 | Hsu | ....................... H04W 36/28 |
| 2020/0351988 | A1 * | 11/2020 | Chen | ................ H04W 72/0453 |

* cited by examiner

*Primary Examiner* — Benjamin H Elliott, IV
(74) *Attorney, Agent, or Firm* — Schwegman Lundberg & Woessner, P.A.

(57) ABSTRACT

A multi-link access point (AP) device is configured for multi-link operation to communicate with a plurality of non-AP stations (STAs) over a plurality of corresponding links. A multi-link policy element is encoded for transmission to the non-AP STAs to signal a multi-link policy. The multi-link policy element comprises a common policy sub-element and a plurality of link-specific policy sub-elements. The common policy sub-element is applicable to all links. Each of the link-specific policy sub-elements is applicable to a single link. The link-specific policy sub-elements comprise at least a first link-specific policy sub-element applicable to a first link and a second link-specific policy sub-element applicable to a second link. The common policy sub-element defines a link policy for all links that have been set up between the multi-link AP device and the non-AP STAs. Each link-specific policy element defines a link policy specific to an associated link.

20 Claims, 2 Drawing Sheets

MULTI-LINK POLICY SIGNALING FOR EXTREMELY HIGH THROUGHPUT (EHT)

PRIORITY CLAIM

This application claims priority under 35 U.S.C. 119(e) to U.S. Provisional Patent Application Ser. No. 62/858,462, filed Jun. 7, 2019 which is incorporated herein by reference in its entirety.

TECHNICAL FIELD

Embodiments pertain to wireless communications. Some embodiments relate wireless local area networks (WLANs) that operate in accordance with the IEEE 802.11 standards. Some embodiments relate to IEEE 802.11be Extremely High Throughput (EHT) (i.e., the IEEE P802.11-Task Group BE EHT) (Wi-Fi 7).

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
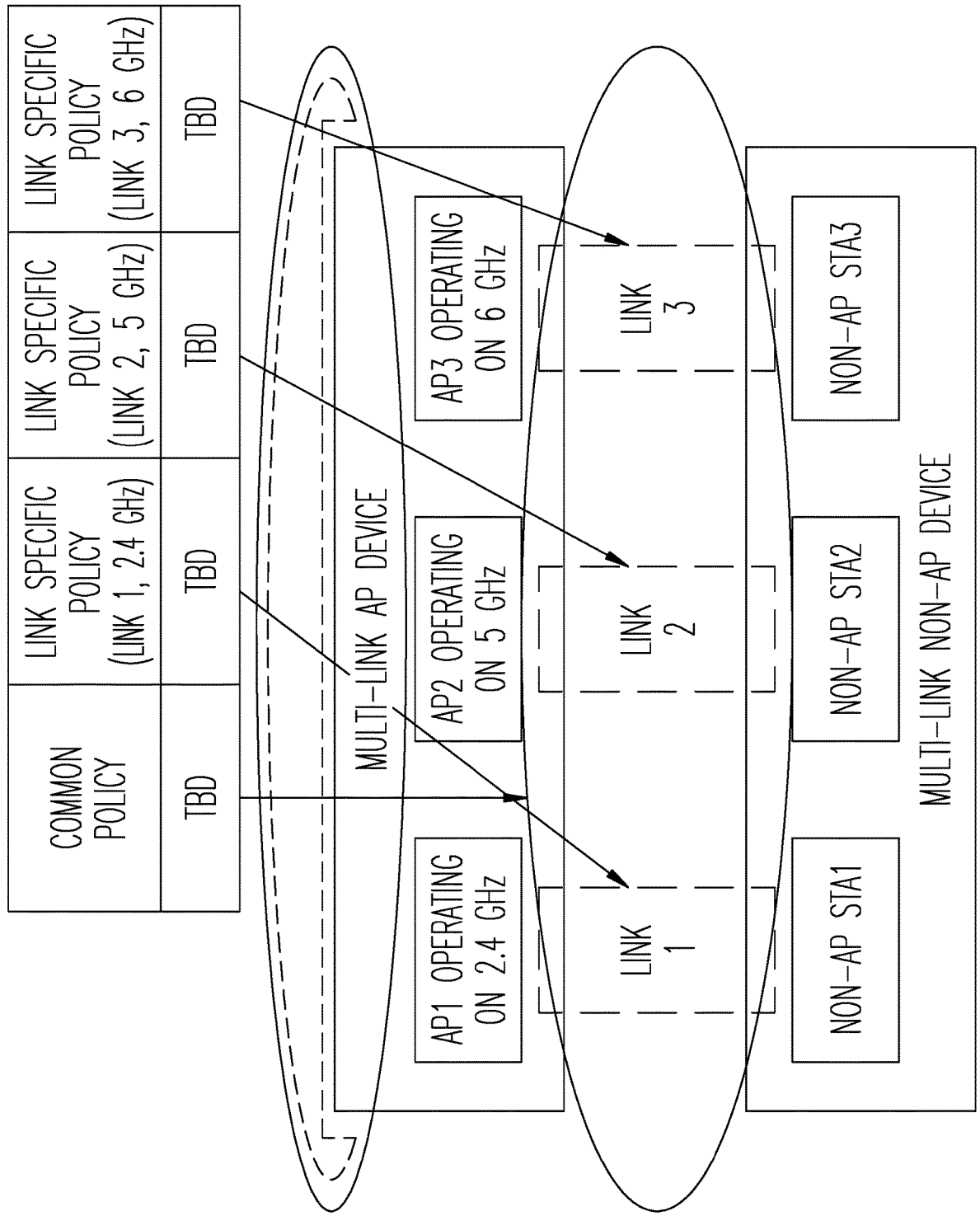
FIG. 1 illustrates Multi-AP Policy element signaling in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In some embodiments, a multi-link access point (AP) device is configured for multi-link operation to communicate with a plurality of non-AP stations (STAs) over a plurality of corresponding links. A multi-link policy element is encoded for transmission to the non-AP STAs to signal a multi-link policy. The multi-link policy element comprises a common policy sub-element and a plurality of link-specific policy sub-elements. The common policy sub-element is applicable to all links. Each of the link-specific policy sub-elements is applicable to a single link. The link-specific policy sub-elements comprise at least a first link-specific policy sub-element applicable to a first link and a second link-specific policy sub-element applicable to a second link. The common policy sub-element defines a link policy for all links that have been set up between the multi-link AP device and the non-AP STAs. Each link-specific policy element defines a link policy specific to an associated link.

In some embodiments, the multi-link AP device comprises a first AP (AP1) that operates the first link with a first non-AP STA (STA1) and a second AP (AP2) that operates the second link with a second non-AP STA (STA2). In some embodiments, the multi-link policy element is encoded for transmission on active links operated by the multi-link AP device.

In some embodiments, the common policy sub-element comprises a plurality of different fields, each of the different fields designating policy information for a specific aspect of the multi-link operation, including one or more of pre-association, post-association management and data plane policy.

In some embodiments, the multi-link AP device is configured to enforce compliance of the multi-link policy by the non-AP STAs that are non-AP Multi-link devices (non-AP MLDs).

In some embodiments, transmission of the multi-link policy element advertises the multi-link policy that the non-AP MLDs are to comply with.

In some embodiments, the multi-link AP device is configured to encode the multi-link policy element for transmission in a beacon frame or a probe response frame. In some embodiments, the multi-link AP device is configured to encode the multi-link policy element for transmission in broadcast or unicast management frames.

In some embodiments, the links of the plurality utilize non-interfering channels. In some embodiments, the multi-AP device further comprises a third AP (AP3) to operate a third link with a third non-AP STA (STA3) and the multi-link policy element is further encoded to include a third link-specific policy sub-element applicable to a third link. In some embodiments, the first link is a 2.4 GHz band link, the second link is a 5 GHz band link, and the third link is a 6 GHz band link. In some embodiments, the processing circuitry comprises a baseband processor, and wherein the memory is configured to store the multi-link policy element.

These embodiments are discussed in more detail below.

Multi-link operation is a key feature for the EHT amendment to IEEE 802.11. It is applicable to address many different use cases. Depending on the specific characteristics and requirements of these use cases, we need to configure different rules for Multi-link operation. Embodiments disclosed herein provide the basic format of defining the Multi-link policy element, which specifies and advertises the Multi-link policy enforced by a Multi-link AP device that associated STAs have to comply with.

Embodiments disclosed herein specify the Multi-link policy either in a separate Multi-link Policy element, or as a set of fields that can be included in an existing element. The format of the Multi-link Policy signaling should consist of two parts: The Common Policy part that defines the policy applied across all active links maintained by a Multi-link AP device, and several Link Specific Policy parts, each of which defines the policy that only applies to one specific link. The proposed Multi-link Policy signaling establishes a unified framework that is flexible enough to apply multi-link operations to address different use cases.

Embodiments disclosed herein define a way to specify and advertise the Multi-link policy enforced by a Multi-link AP device, which STAs have to comply with.

The Multi-link Policy is included in frames like Beacon frame and Probe Response frame.

The Multi-link AP device can dynamically adjust certain parameters of Multi-band Policy according to specific use cases it currently focuses, by simply updating the Multi-link Policy and advertising it to STAs.

This Multi-link Policy could be a separate element, or part of another element.

In some embodiments, the Multi-link Policy may be a separate element, referred to as the Multi-link Policy element, and the proposed format is shown in Table 1:

|        | Element ID | Length | Element ID Extension | Common Policy | Link Specific Policy | Link Specific Policy | ... | Link Specific Policy |
|--------|------------|--------|----------------------|---------------|----------------------|----------------------|-----|----------------------|
| Octets | 1          | 1      | 1                    | TBD           | TBD                  | TBD                  | ... | TBD                  |

Since some aspects of the Multi-link policy apply across different links (like band transition and aggregation), while some can be link-dependent (like TIDs allowed, channel access), some embodiments disclosed herein define the Multi-link Policy element as follows:

- The Common Policy sub-element defines the policy applied across all active links.
- The Common Policy sub-element can be further divided into different fields, each of which corresponding to the policy information for a specific aspect of the Multi-link operations (Pre-association, Post-association management or data plane etc.).
- The Common Policy sub-element shall always be present in the Multi-link Policy element
- Each Link Specific Policy sub-element defines the policy that only applies to one specific link.

In some embodiments, the Multi-link Policy element may be transmitted in all active bands operated by the Multi-link AP device.

FIG. 1 illustrates the relationship of the signaling of the Multi-link Policy element and the actual policy enforced upon different links maintained by a Multi-link AP device. In these embodiments, the Multi-link Policy is defined as a set of fields in an existing element or frame, then the signaling is almost the same, i.e., we still have the Common Policy part and several Link Specific Policy parts. As illustrated in the example of FIG. 1, the Multi-link Policy element may include a common policy sub-element applicable to all links, a link specific policy sub-element applicable to a first link (e.g., a 2.4 GHz link), a link specific policy sub-element applicable to a second link (e.g., a 5 GHz link), and a link specific policy sub-element applicable to a third link (e.g., a 6 GHz link).

IEEE draft specification IEEE P802.11ax/D4.0, February 2019 is incorporated herein by reference in its entirety. IEEE draft specification IEEE P802.11REVmd/D2.0, is incorporated herein by reference in its entirety.

Figure 2:
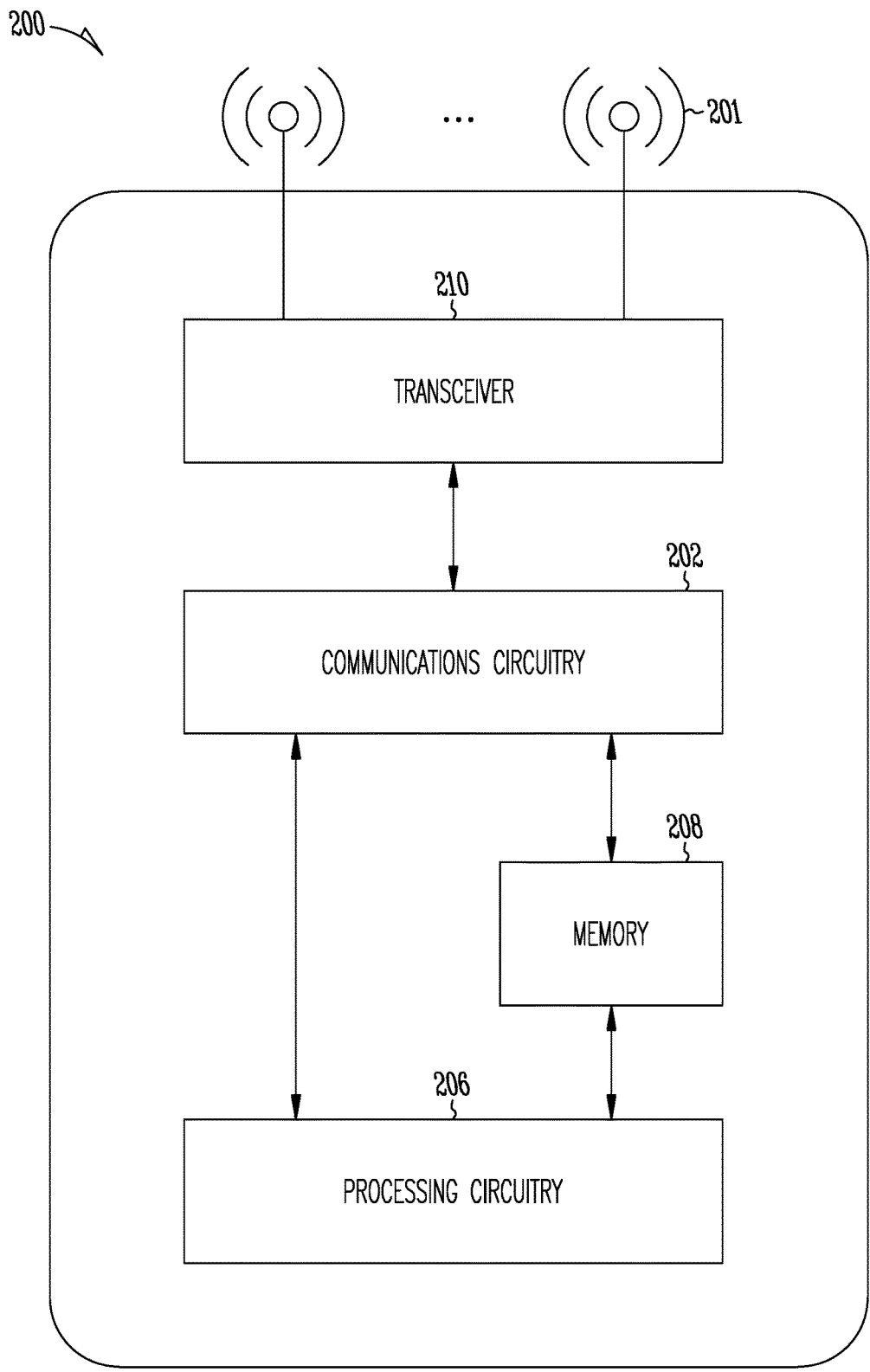
FIG. 2 illustrates a functional diagram of an exemplary communication station in accordance with some embodiments.

FIG. 2 illustrates a functional diagram of an exemplary communication station in accordance with some embodiments. Communication station 200 may be suitable for use as an AP or non-AP station, including multi-link AP devices and multi-link non-AP devices illustrated in FIG. 1

The communication station 200 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 200 may include communications circuitry 202 and a transceiver 210 for transmitting and receiving signals to and from other communication stations using one or more antennas 201. The communications circuitry 202 may include circuitry that can operate the physical layer (PHY) communications and/or medium access control (MAC) communications for controlling access to the wireless medium, and/or any other communications layers for transmitting and receiving signals. The communication station 200 may also include processing circuitry 206 and memory 208 arranged to perform the operations described herein. In some embodiments, the communications circuitry 202 and the processing circuitry 206 may be configured to perform operations detailed in the above figures, diagrams, and flows.

In accordance with some embodiments, the communications circuitry 202 may be arranged to contend for a wireless medium and configure frames or packets for communicating over the wireless medium. The communications circuitry 202 may be arranged to transmit and receive signals. The communications circuitry 202 may also include circuitry for modulation/demodulation, upconversion/downconversion, filtering, amplification, etc. In some embodiments, the processing circuitry 206 of the communication station 200 may include one or more processors. In other embodiments, two or more antennas 201 may be coupled to the communications circuitry 202 arranged for sending and receiving signals. The memory 208 may store information for configuring the processing circuitry 206 to perform operations for configuring and transmitting message frames and performing the various operations described herein. The memory 208 may include any type of memory, including non-transitory memory, for storing information in a form readable by a machine (e.g., a computer). For example, the memory 208 may include a computer-readable storage device, read-only memory (ROM), random-access memory (RAM), magnetic disk storage media, optical storage media, flash-memory devices and other storage devices and media.

In some embodiments, the communication station 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 200 may include one or more antennas 201. The antennas 201 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 200 may include one or more of a keyboard, a display, a non-volatile memory port, multiple antennas, a graphics processor, an application processor, speakers, and other mobile device elements. The display may be an LCD screen including a touch screen.

Although the communication station 200 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 200 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The invention claimed is:

1. An apparatus of a multi-link access point (AP) device comprising:
processing circuitry; and memory, the processing circuitry to configure the multi-link AP device for multi-link operation to communicate with a plurality of non-AP stations (STAs) over a plurality of corresponding links, wherein the processing circuitry is configured to:
encode a multi-link policy element for transmission to the non-AP STAs, the multi-link policy element encoded to signal a multi-link policy, the multi-link policy element comprising a common policy sub-element and a plurality of link-specific policy sub-elements, the common policy sub-element applicable to all links, each of the link-specific policy sub-element applicable to a single link, wherein the link-specific policy sub-elements comprise at least a first link-specific policy sub-element applicable to a first link, and a second link-specific policy sub-element applicable to a second link,
wherein the common policy sub-element defines a link policy for all links that have been set up between the multi-link AP device and the non-AP STAs, and
wherein each link-specific policy element defines a link policy specific to an associated link.

2. The apparatus of claim 1, wherein the multi-link AP device comprises a first AP (AP1) that operates the first link with a first non-AP STA (STA1) and a second AP (AP2) that operates the second link with a second non-AP STA (STA2).

3. The apparatus of claim 2, wherein the multi-link policy element is encoded for transmission on active links operated by the multi-link AP device.

4. The apparatus of claim 3 wherein the common policy sub-element comprises a plurality of different fields, each of the different fields designating policy information for a specific aspect of the multi-link operation, including one or more of pre-association, post-association management and data plane policy.

5. The apparatus of claim 4, wherein the processing circuitry is configured to enforce compliance of the multi-link policy by the non-AP STAs that are non-AP Multi-link devices (non-AP MLDs).

6. The apparatus of claim 5, wherein transmission of the multi-link policy element advertises the multi-link policy that the non-AP MLDs are to comply with.

7. The apparatus of claim 3 wherein the processing circuitry is configured to encode the multi-link policy element for transmission in a beacon frame or a probe response frame.

8. The apparatus of claim 3 wherein the processing circuitry is configured to encode the multi-link policy element for transmission in broadcast or unicast management frames.

9. The apparatus of claim 3, wherein the links of the plurality utilize non-interfering channels.

10. The apparatus of claim 3, wherein the multi-AP device further comprises a third AP (AP3) to operate a third link with a third non-AP STA (STA3), and
wherein the multi-link policy element is further encoded to include a third link-specific policy sub-element applicable to a third link.

11. The apparatus of claim 10, wherein the first link is a 2.4 GHz band link, the second link is a 5 GHz band link, and the third link is a 6 GHz band link.

12. The apparatus of claim 11, wherein the processing circuitry comprises a baseband processor, and wherein the memory is configured to store the multi-link policy element.

13. A non-transitory computer-readable storage medium that stores instructions for execution by processing circuitry of a multi-link access point (AP) device to configure the multi-link AP device for multi-link operation to communicate with a plurality of non-AP stations (STAs) over a plurality of corresponding links, the processing circuitry configured to:
encode a multi-link policy element for transmission to the non-AP STAs, the multi-link policy element encoded to signal a multi-link policy, the multi-link policy element comprising a common policy sub-element and a plurality of link-specific policy sub-elements, the common policy sub-element applicable to all links, each of the link-specific policy sub-element applicable to a single link, wherein the link-specific policy sub-elements comprise at least a first link-specific policy sub-element applicable to a first link, and a second link-specific policy sub-element applicable to a second link,
wherein the common policy sub-element defines a link policy for all links that have been set up between the multi-link AP device and the non-AP STAs, and
wherein each link-specific policy element defines a link policy specific to an associated link.

14. The non-transitory computer-readable storage medium of claim 13, wherein the multi-link AP device comprises a first AP (API) that operates the first link with a first non-AP STA (STA1) and a second AP (AP2) that operates the second link with a second non-AP STA (STA2).

15. The non-transitory computer-readable storage medium of claim 14, wherein the multi-link policy element is encoded for transmission on active links operated by the multi-link AP device.

16. The non-transitory computer-readable storage medium of claim 15 wherein the common policy sub-element comprises a plurality of different fields, each of the different fields designating policy information for a specific aspect of the multi-link operation, including one or more of pre-association, post-association management and data plane policy.

17. The non-transitory computer-readable storage medium of claim 16, wherein the processing circuitry is configured to enforce compliance of the multi-link policy by the non-AP STAs that are non-AP Multi-link devices (non-AP MLDs).

18. The non-transitory computer-readable storage medium of claim 17, wherein transmission of the multi-link policy element advertises the multi-link policy that the non-AP MLDs are to comply with.

19. The non-transitory computer-readable storage medium of claim 15 wherein the processing circuitry is configured to encode the multi-link policy element for transmission in a beacon frame or a probe response frame.

20. The non-transitory computer-readable storage medium of claim 15, wherein the multi-AP device further comprises a third AP (AP3) to operate a third link with a third non-AP STA (STA3), wherein the multi-link policy element is further encoded to include a third link-specific policy sub-element applicable to a third link, and wherein the first link is a 2.4 GHz band link, the second link is a 5 GHz band link, and the third link is a 6 GHz band link.

* * * * *

UNITED STATES PATENT AND TRADEMARK OFFICE
CERTIFICATE OF CORRECTION

| | | |
|---|---|---|
| PATENT NO. | : 11,665,780 B2 | Page 1 of 1 |
| APPLICATION NO. | : 16/893846 | |
| DATED | : May 30, 2023 | |
| INVENTOR(S) | : Chen et al. | |

It is certified that error appears in the above-identified patent and that said Letters Patent is hereby corrected as shown below:

In the Claims

In Column 6, Line 52, in Claim 14, delete "(API)" and insert --(AP1)-- therefor

Signed and Sealed this
Tenth Day of September, 2024

Katherine Kelly Vidal
*Director of the United States Patent and Trademark Office*